(12) United States Patent
Relander et al.

(10) Patent No.: US 7,076,064 B2
(45) Date of Patent: Jul. 11, 2006

(54) MAINTAINING END-TO-END SYNCHRONIZATION ON TELECOMMUNICATIONS CONNECTION

(75) Inventors: Rasmus Relander, Helsinki (FI); Timo Stenberg, Vantaa (FI)

(73) Assignee: Nokia Corporation, Espoo (FI)

( * ) Notice: Subject to any disclaimer, the term of this patent is extended or adjusted under 35 U.S.C. 154(b) by 763 days.

(21) Appl. No.: 09/988,357

(22) Filed: Nov. 19, 2001

(65) Prior Publication Data

US 2002/0066012 A1    May 30, 2002

(30) Foreign Application Priority Data

Nov. 28, 2000 (FI) ................................ 20002607

(51) Int. Cl.
*G06F 17/00* (2006.01)

(52) U.S. Cl. ...................... 380/247; 380/270; 380/273; 380/35

(58) Field of Classification Search ................ 713/151; 710/53; 709/224, 231; 375/240; 380/270–273, 380/277–280, 35–43
See application file for complete search history.

(56) References Cited

U.S. PATENT DOCUMENTS

| 5,297,208 | A | * | 3/1994 | Schlafly et al. ............. 380/277 |
| 5,642,141 | A | * | 6/1997 | Hale et al. ...................... 347/3 |
| 6,374,108 | B1 | * | 4/2002 | Jakobsen et al. ......... 455/432.1 |
| 6,618,438 | B1 | * | 9/2003 | Le Roux et al. ........ 375/240.12 |

FOREIGN PATENT DOCUMENTS

| EP | 0 786 881 | 7/1997 |
| EP | 0 921 666 | 6/1999 |

OTHER PUBLICATIONS

"TETRA—a Whatis.com definition", 2000, [Retrieved from Internet Mar. 16, 2005], http://searchmobilecomputing.techtarget.com/sDefinition/0,,sid40_gci214574,00.html.*
Samarakoon et al., "Encrypted Video over TETRA", Applicant Submitted Prior Art.*
http://www.microsoft.com/technet/community/columns/cableguy/cg1104.mspx.*
http://www.cisco.com/warp/public/cc/pd/witc/ao350ap/prodlit/1515_pp.htm.*
http://www.faqs.org/rfcs/rfc2032.html.*
Samarakoon et al., "Encrypted Video Over Tetra," IEEE Seminar on Tetra Market and Technology Developments, London, UK, Feb. 10, 2000, 5 pp.
Montgomery, "Techniques for Packet Voice Synchronization," IEEE Journal on Selected Areas in Communication, Vo. SAC-1, No. 6, Dec. 1983, 1022-1028.

* cited by examiner

*Primary Examiner*—David Jung
(74) *Attorney, Agent, or Firm*—Pillsbury Winthrop Shaw Pittman LLP

(57) ABSTRACT

A method and arrangement for maintaining end-to-end synchronization on a telecommunications connection on which data are transmitted in frames substantially in real time and using synchronized end-to-end encryption which is synchronized by occasionally transmitting synchronization vectors in the frames, at least part of the telecommunications connection being a packet-switched connection, whereby the reproduction delay of the data to be transmitted can be increased by adding one or more extra frames to the frame sequence to be transferred and reduced by removing one or more frames from the frame sequence to be transferred, the arrangement including reproduction delay adjustment mechanisms arranged to change the reproduction delay during the data transmission at such a moment that the frame to be transferred next includes a synchronization vector.

21 Claims, 3 Drawing Sheets

MAINTAINING END-TO-END SYNCHRONIZATION ON TELECOMMUNICATIONS CONNECTION

BACKGROUND OF THE INVENTION

The invention relates to a method and equipment for maintaining end-to-end synchronization on a telecommunications connection.

A vitally important feature of telecommunications systems, such as public authority networks, is that the traffic is secure from eavesdropping. The air interface is typically encrypted, and although radio traffic is being monitored, an outsider is not capable of removing the encryption. Infrastructure traffic, however, is not necessarily encrypted, which means that traffic, such as speech, can be decrypted using the codec of the system in question. Although in principle it is not possible for an outsider to listen to the speech flow from the infrastructure, most demanding users consider this a security risk. For this reason, a solution has been developed to allow speech to be encrypted with end-to-end encryption. One example of a system enabling end-to-end encryption is the TETRA system (TErrestrial Trunked RAdio).

The underlying idea of end-to-end encryption is that the network user, such as a public authority, carries out the encryption and decryption independently, regardless of the transfer network employed, in connection with terminal equipment, for example.

When end-to-end encryption is used in the TETRA system, for example, the sender first encodes a voice sample of 60 ms using a TETRA codec to produce a plaintext sample. Using a specific key stream segment, the transmitting terminal equipment creates an encrypted sample, which is transmitted to the network. With the same key stream segment the recipient then decrypts the encrypted sample to reproduce the plaintext sample.

To prevent the breaking of the encryption, the key stream segment is constantly changed, each 60-ms voice sample being encrypted using a separate key stream segment. Both key stream generators must therefore agree on the key stream segment to be used for each frame. This task belongs to synchronization control and it is carried out using synchronization vectors transmitted between terminal equipment by means of an in-band signal.

The key stream generator generates a key stream segment on the basis of a specific key and an initialisation vector. The keys are distributed to each terminal participating in the encrypted call. This forms part of the terminal equipment settings. A new key stream segment is thus created once in every 60 milliseconds. After each frame, the initialisation vector is changed. The simplest alternative is to increment it by one, but every encryption algorithm comprises its own incrementation method, which may be even more complex, to prevent the breaking of encryption.

The synchronization control is responsible for ensuring that both ends know the initialisation vector used with which each frame is encrypted. To allow the encrypter and the decrypter to agree on the value of the initialisation vector, a synchronisation vector is sent at the beginning of a speech item. When a group call is concerned, joining the call must be possible also during a speech item. For this reason, the synchronisation vector is sent continuously, for example 1–4 times a second. In addition to the initialisation vector, the synchronization vector comprises for example a key identifier and CRC error check to enable the terminal equipment to verify the integrity of the synchronization vector. The recipient thus counts the number of frames transmitted after the synchronization vector and on the basis of the last received initialisation vector and the number of the frames, the key stream generator generates a new initialisation vector.

A data transmission network may comprise one or more packet-switched connections, such as IP (Internet Protocol) connections, in which data are transmitted using voice over IP (VoIP), for example. A standard protocol for transferring real-time data, such as voice and video image, in an IP network, for example, is RTP (Real Time Protocol). The IP network typically causes a varying delay in the transfer of packets. For speech intelligibility, for example, variation in the delay is most harmful. To compensate for this, the receiving end of the RTP transmission buffers incoming packets to a jitter buffer and reproduces them at a specific reproduction time. A packet that has arrived before the reproduction time participates in the reconstruction of the original signal, whereas a packet arriving after the reproduction time remains unused and is discarded.

On one hand, a real-time application requires an as short end-to-end delay as possible and therefore the reproduction delay should be reduced. On the other hand, a long reproduction delay allows a long time for the arrival of the packets and thus more packets can be accepted. Consequently, the reproduction delay value should be continuously adjusted according to the network conditions. Most RTP algorithms comprise a facility that adjusts the reproduction delay automatically according to the network conditions to improve voice quality. To shift the reproduction delay onward by 60 ms, for example, the IP gateway creates a replacement packet of 60 ms. In other words, an extra frame is added to the frame flow being transmitted. To shift the reproduction delay backward, at least one frame is removed.

A problem with the arrangement described above is that when synchronized end-to-end encryption coding is used and an extra frame is added to the frame flow, this causes the frame counter at the receiving end to be one frame ahead with regard to incoming frames and, therefore, the key stream segment of the receiving end no longer corresponds to that of the transmitting end. Correspondingly, if a frame is removed from the frame flow, the frame counter at the receiving end is delayed by one frame in relation to incoming frames, and the key stream segment no longer corresponds to that of the transmitting end.

The shifting of the reproduction delay in the middle of a speech item, for example, therefore causes end-to-end synchronization to be lost, and the encrypted speech can no longer be decoded. This continues until the transmitting end sends a new synchronization vector to synchronize the receiving end. This can be avoided in semiduplex calls, for example, by changing the reproduction delay after speech items only. If the speech items are long, the possibility to change the reproduction delay may appear disadvantageously seldom and thus speech quality may be poor until the end of the entire speech item because the reproduction delay cannot be changed earlier. Moreover, in duplex calls, for example, where there are no speech items and the terminal transmits continuously, the reproduction delay cannot be changed at all during the entire call if loss of synchronization is to be avoided.

BRIEF DESCRIPTION OF THE INVENTION

It is therefore an object of the invention to provide a method and equipment implementing the method that allow the above problems to be solved. The object of the invention is achieved by a method and system characterized by what is stated in independent claims 1, 7 and 13. The preferred embodiments of the invention are disclosed in the dependent claims.

An underlying idea of the invention is that if the reproduction delay is changed during data transmission, such as a speech item or a call, the time of the change is selected such that the frame that will be the next after the change comprises a synchronization vector, whereby the receiving end is synchronized immediately after the change and thus there will be no gaps in the decryption of the encrypted data and, thereby, in the decoding.

An advantage of the method and system of the invention is that they allow the reproduction delay to be changed also during data transmission without the decoding of the encrypted data being thereby disturbed.

BRIEF DESCRIPTION OF THE DRAWINGS

In the following, the invention will be described in greater detail in connection with the preferred embodiments and with reference to the accompanying drawings, in which.

DETAILED DESCRIPTION OF THE INVENTION

In the following, the invention will be described by way of example with reference to a TETRA system. However, the invention is not meant to be restricted to any particular telecommunications system or data transmission protocol. The applications of the invention to other systems will be apparent to a person skilled in the art.

Figure 1:
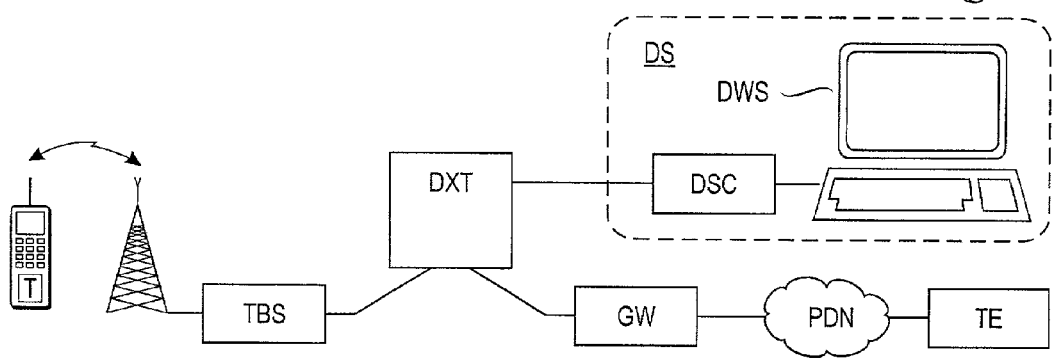
FIG. 1 is a block diagram illustrating the structure of a TETRA system.

FIG. 1 shows an example of a TETRA system structure. Although the network elements referred to in the Figure and in the following specification are those of the TETRA system, this does not in any way restrict the application of the invention to other telecommunications systems. It is to be noted that the Figure only shows elements relevant to the understanding of the invention, and the structure of the system may differ from the one disclosed without this having any relevance to the basic idea of the invention. It is also to be noted that an actual mobile communication system may comprise an arbitrary number of each element. Mobile stations MS communicate with TETRA base stations TBS over a radio path. The mobile stations MS can also use a direct mode to communicate with each other directly, without using the base stations TBS. Each base station TBS is coupled with a connecting line to one of the digital exchanges for TETRA (DXT) of the fixed network. The TETRA exchanges DXT have a fixed connection to other exchanges and to a TETRA node exchange DXTc (Digital Central Exchange for TETRA, not shown), which is an exchange to which other exchanges DXT and/or node exchanges DXTc are connected to provide alternative traffic routes. External connection interfaces, if any, to the public switched telephone network PSTN, integrated services digital network ISDN, a private automatic branch exchange PABX and to a packet data network PDN, for example, may reside in one or more exchanges DXT. Of the above interfaces, the Figure shows a connection to the packet data network PDN over a gateway GW. The gateway GW is responsible for converting circuit-switched data coming from the exchange DXT into packet-switched data routed for the packet data network PDN, and vice versa. This allows terminal equipment TE connected to the packet data network PDN to communicate with the TETRA network. The gateway GW may be a separate network element or a part of the exchange DXT, for example. Further, the Figure shows a dispatcher system DS connected to the exchange DXT, the system being composed of a dispatcher station controller DSC and a dispatcher workstation DWS connected to it. The administrator of the dispatcher system controls the calls and other functions of the mobile stations MS through the workstation DWS.

Figure 2:
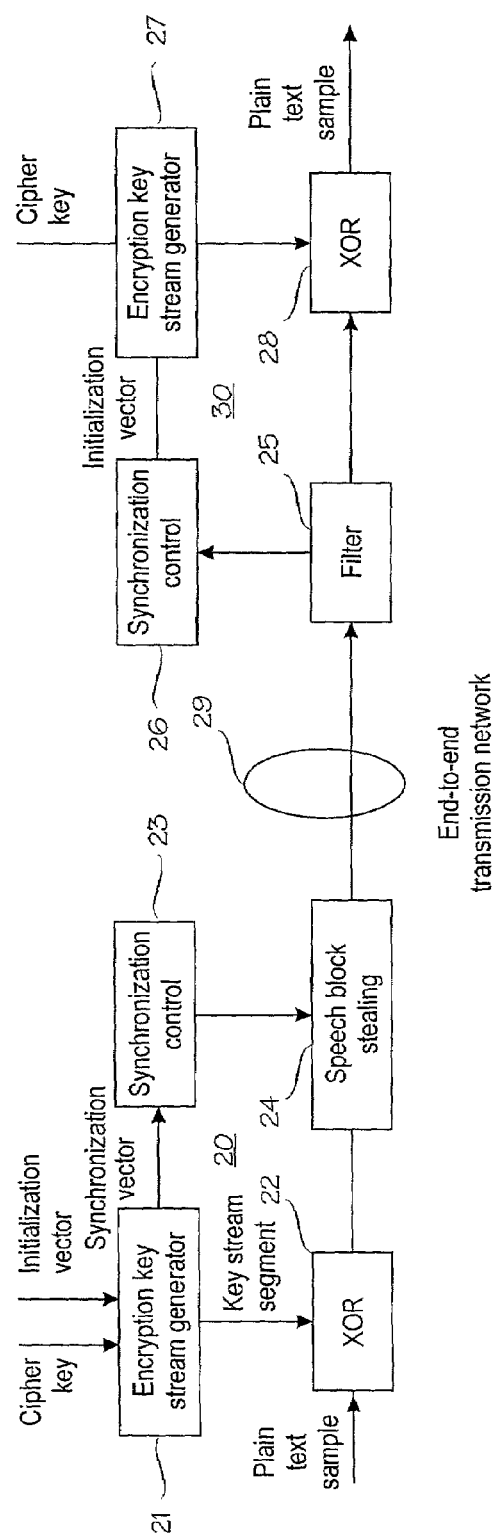
FIG. 2 is a block diagram illustrating the functioning of end-to-end encryption.

FIG. 2 illustrates the function of end-to-end encryption. When using end-to-end encryption, a sender 20 first encodes a 60-ms voice sample using a TETRA codec to produce a plaintext sample (P). The mobile station generates a key stream segment KSS having the length of P at an encryption key stream generator 21. An encrypted sample (C) is obtained by carrying out a binary XOR operation in block 22:

C=Px or KSS

The encrypted sample is then transmitted to a transmission network 29. A recipient 30 carries out the same XOR operation in block 28 by using the same key stream segment to reproduce the plaintext sample P.

P=C or KSS

To prevent the breaking of the encryption, the key stream segment KSS is changed continuously and thus each frame is encrypted with a separate key stream segment. Both encryption key stream generators 21 and 27 must therefore agree on the key stream segment to be used for each frame. This task belongs to synchronization control 23 and 26. For this purpose, synchronization vectors transmitted between the terminal equipment by means of an in-band signal are used.

The encryption key stream generator (EKSG) 21 and 27 generates a key stream segment (KSS) on the basis of a cipher key (CK) and an initialisation vector (IV). A new key stream segment is generated once in every 60 milliseconds.

KSS=EKSG (CK, IV)

After each frame, the initialisation vector is changed. The simplest way to carry this out is to increment the vector by one, but every encryption algorithm comprises its own incrementing method, which may be even more complex, to prevent the breaking of encryptions.

The synchronization control 23 and 26 is responsible for making sure that both ends 20 and 30 know the initialisation vector used for encrypting each frame. To allow the encrypter 20 and the decrypter 30 to agree on the value of the initialisation vector, a synchronization vector (SV) is transmitted at the beginning of a speech item. When a group call is concerned, joining the call must be possible even during a speech item. For this purpose, the synchronization vector is transmitted continuously approximately 1–4 times a second. In addition to the initialisation vector, the synchronization vector comprises a key identifier and CRC error check, for example, which allow the terminal equipment to verify the integrity of the synchronization vector.

Figure 3:
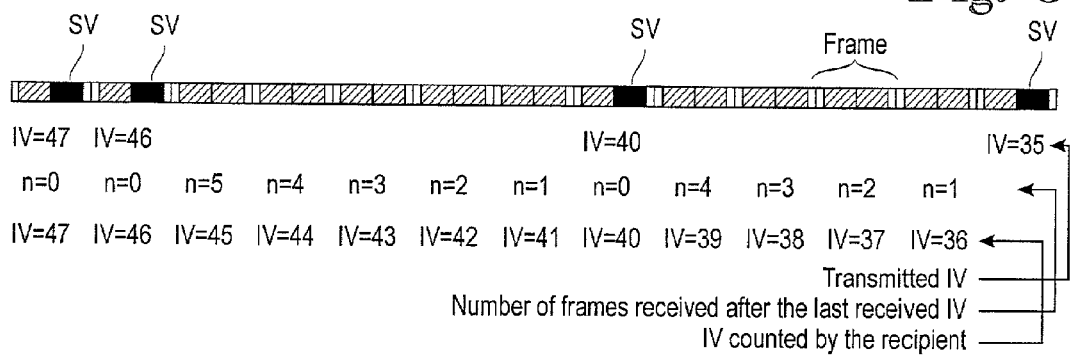
FIG. 3 illustrates the calculation of an initialisation vector carried out by the recipient.

The recipient 30 thus counts the number of frames (n) transmitted after the synchronization vector. The key stream generator 27 of the recipient 30 generates a new initialisation vector IV on the basis of the last received initialisation vector and the number of the frames. The counting of the initialisation vector IV carried out by the recipient is illustrated in FIG. 3 which shows the frame sequence to be transmitted. Frames 1, 6, 12 and 13 of the sequence comprise a synchronization vector SV informing the number of the initialisation vector IV.

Ends 20 and 30 should both agree on how a call is to be encrypted. Synchronization control units 23 and 26 provided at both ends communicate with each other by means of U-stolen speech blocks. The transmitting terminal equipment uses one or more speech blocks within the frame for its own purposes. This takes place in block 24. This is indicated to the receiving terminal equipment by an appropriate setting of three first control bits inside the frame. The infrastructure 29 thus understands that the data in question is terminal-to-terminal data and it therefore transmits the data transparently, without changing them. In addition, the receiving terminal equipment detects that the speech block in question does not comprise speech data and therefore does not send them to the codec but processes them accordingly, i.e. synchronization control data are filtered to the synchronization control 26 in block 25, and the receiving equipment generates a replacement sound to replace the stolen speech. The stealing of a speech block deletes 30 ms of speech. This would cause a break in the speech, which would impair speech quality and make it more difficult to understand. To avoid this, the TETRA codec comprises a replacement mechanism. In reality the user does not consider the missing of speech inconvenient, provided that speech blocks are not stolen more than 4 times a second. Each terminal participating in an encrypted call receives a cipher key CK; this has been determined in the settings of the terminal equipment.

The packet-switched data network PDN shown in FIG. 1 may be for example the Internet, which uses TCP/IP protocols. TCP/IP is the name for a family of data transfer protocols used within a local area network or between them. The protocols are IP (Internet Protocol), TCP (Transmission Control Protocol) and UDP (User Datagram Protocol). The family also comprises other protocols for specific services, such as file transfer, e-mail, remote use, etc.

TCP/IP protocols are divided into layers: data link layer, network layer, transport layer and application layer. The data link layer is responsible for the physical access of the terminal to the network. It is mainly associated with the network interface card and the driver. The network layer is often referred to as the Internet or IP layer. This layer is responsible for the transfer of packets inside the network and for their routing from one device to another, for example, on the basis of an IP address. The network layer is provided by the IP in the TCP/IP protocol family. The transport layer provides a data flow service between two terminals for the application layer and guides the flows to the correct application in the terminal. There are two transfer protocols in the Internet protocol: TCP and UDP. Another task of the transport layer is to guide the packets to the correct applications on the basis of port numbers. TCP provides a reliable data flow from one terminal to another. TCP splits the data into packets of suitable size, acknowledges received packets and controls that transmitted packets are acknowledged as received at the other end. TCP is responsible for reliable end-to-end transmission, i.e. the application does not need to attend to it. On the other hand, UDP is a much simpler protocol. UDP is not responsible for the arrival of data and if this is required, the application level is responsible for it. The application level is responsible for the data processing of each application.

RPT is a standard Internet protocol for the transfer of real-time data, such as voice and video image. It can be used for on-demand media services or interactive services, such as IP calls. RTP is composed of a media part and a control part, the latter being called RTCP (Real Time Control Protocol). The RTP media part provides support for real-time applications, including time support, detection of loss, security support and content identification. RTCP allows for real-time conferences within groups of different sizes and evaluation of end-to-end service quality. It also supports the synchronization of a plurality of media flows. RTP has been designed to be independent of the transmission network, although in the Internet network RTP usually employs IP/UDP. RTP protocol comprises several features enabling real-time end-to-end data transfer. At each end, an audio application regularly sends small audio data samples of 30 ms, for example. Each sample is provided with an RTP header. The RTP header and the data are then packed in UDP and IP packets.

The RTP header identifies the content of a packet. The value of this field indicates the coding method to be used (PCM, ADPCM, LPC, etc.) in the RTP packet payload. Packets transferred over the Internet, as well as other packet networks, may arrive in a random order, be delayed for a varying time, or even disappear completely. To prevent this, each packet in a particular flow is assigned a sequence number and a time stamp according to which a received flow is again arranged to correspond to the original flow. The sequence number is increased by one for each packet. The sequence numbers allow the recipient to detect a missing packet and also to evaluate packet loss.

Figure 4:
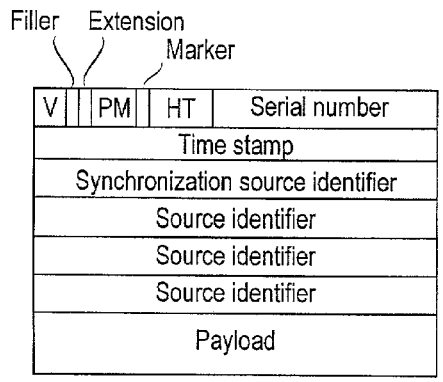
FIG. 4 is a diagram illustrating the structure of an RTP packet.

The time stamp is a 32-bit number indicating the point of time when sampling begins. It is calculated using a clock which increases monotonously and linearly along with time. The clock frequency must be selected to be suitable for the content, fast enough for calculating jitter and to enable synchronization. For example, when a PCM-A-law coding method is used, the clock frequency is 8000 Hz. When RTP packets of 240 bytes are transmitted, which corresponds to 240 PCM samples, the time stamp is increased by 240 for each packet. The length of an RTP header is 3 to 18 words long (a 32-bit word). FIG. 4 illustrates the format of an RTP packet. The fields have the following meanings: V=version, i.e. the RTP version used, currently 2. Filler=the packet comprises filler bits, the last bit indicating their number. Extension=exactly one header extension after the packet. PM=the number of service sources, which indicates how many sources have produced information for the packet. A marker can be used for indicating significant events, such as frame borders. HT=payload type, which indicates the media type included in the payload. The serial number is increased by one for each transmitted data packet. It assists in detecting packet loss and disorder. Its initial value is random. The time stamp indicates the sampling moment of the first byte. It is used for synchronization and for computing jitter. Its initial value is random. SSRC=a randomly selected synchronization source identifier, which indicates the joining point of sources or the original sender, if there is only one source. CSRC list is a list of the sources included in the packet.

Internet causes a varying delay in the transfer of audio packets, which is most harmful for speech intelligibility. To compensate for this, the receiving end of the RTP buffers incoming packets to a jitter buffer and reproduces them at a specific reproduction time. A packet that arriving before the reproduction time participates in the reconstruction of the original signal, whereas a packet arriving after the reproduction time remains unused and is discarded.

Figure 5:
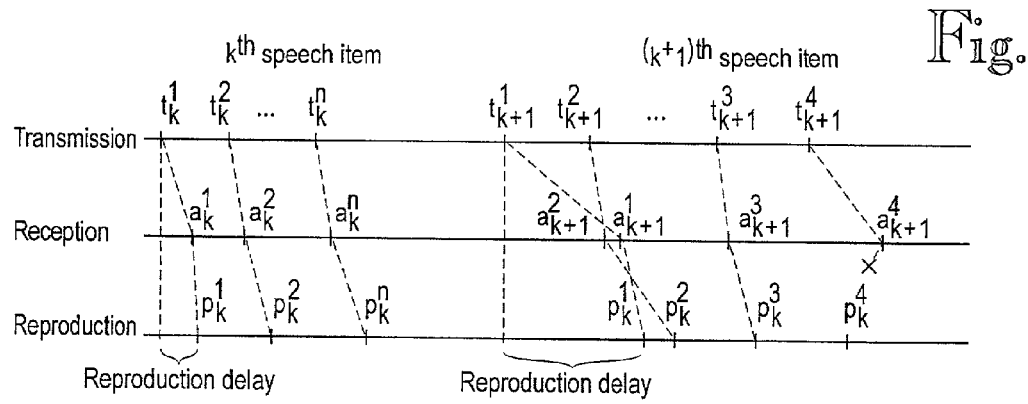
FIG. 5 illustrates the functioning of an RTP algorithm.

FIG. 5 illustrates the operation of an RTP algorithm. Letter t is used in the Figure to denote the time of transmission of the packet, letter a the time of reception and p the time of reproduction. Superscripts indicate the packet number and subscripts the number of the speech item. In the $K^{th}$ speech item the packets arrive at the receiving end after a varying transmission time. The RTP algorithm then reproduces them at the correct moment. In the $(K+1)^{th}$ speech item the order of packets 1 and 2 is changed; packet 4 arrives after its reproduction time and is therefore discarded. The RTP algorithm restores the correct order of the packets, reproduces them at the correct moment and indicates missing or delayed packets for corrective operations, for example. The reproduction delay is time t(reproduction delay)=t(reproduction)−t(transmission). The RTP algorithm makes sure that the reproduction delay remains constant for the entire duration of the speech item.

Figure 6:
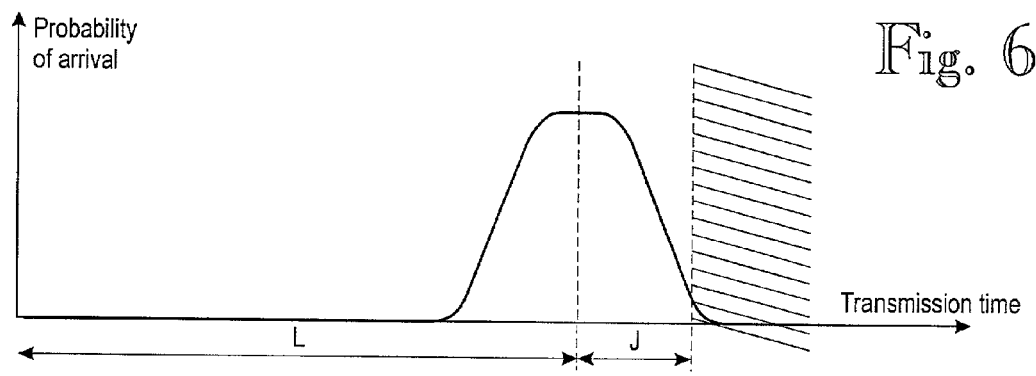
FIG. 6 is a diagram illustrating the probability of arrival of RTP packets as a function of transfer time.

The delay of the IP packet through the network t=t(input)−t(output) consists of two elements. L is a fixed delay depending on the transmission time and the average queue time and J is a varying delay depending on a varying queue time within the IP network and causing jitter. At the receiving end of the IP network there is a jitter buffer which stores the packet in its memory, if the transmission time t<t (reproduction delay). The determining of the reproduction delay is a compromise. On one hand, a real-time application requires an as short an end-to-end delay as possible, and therefore the reproduction delay should be reduced. On the other hand, a long reproduction delay allows for a long time for the arrival of packets and thereby more packets can be accepted. The value of the reproduction delay should therefore be adjusted continuously according to the network conditions. This is illustrated in FIG. 6. A packet with a transmission time t<L+J can be accepted, whereas a packet with a transmission time t>L+J must be discarded. By increasing J it is therefore possible to increase the number of accepted packets. The reproduction delay can be adjusted for example by starting with a low value and then increasing it regularly until the portion of delayed packets stays below a certain limit, for example 1%.

Most RTP algorithms include a facility which adjusts the reproduction delay automatically according to the network conditions to improve voice quality. The reproduction delay can be shifted forward by 60 ms, for example, by creating a replacement speech packet of 60 ms at RTP reception before the speech flow continues. In other words, an extra frame is added to the speech flow. When the reproduction delay is to be shifted backward by 60 ms, an entire speech frame is removed at RTP reception.

In FIG. 1, RTP transmission between the gateway GW and terminal equipment TE thus takes place over the packet network PDN. The gateway GW is responsible for converting circuit-switched speech (or other data) coming from the exchange DXT over a PCM link into IP speech packets, and vice versa. In the TETRA infrastructure speech data are transferred in frames, and thus a natural RTP packet would comprise one frame of speech data. One RTP packet would thus contain 60 ms of speech and correspond directly to the content of one speech frame. Another option is to use an RTP packet containing only half a frame of speech data (30 ms). Compared with a complete-frame packet, a half-frame packet has the following characteristics: 1) when the gateway receives half-frame packets, it must wait for the arrival of two packets before the transmission of an ISI-frame is started. The control bits (BFI, C- or U-stolen) of both speech blocks are namely at the beginning of the frame and the gateway must determine them on the basis of the type of the half-frame packets. 2) If an RTP packet is lost, only 30 ms of speech will be missing, instead of 60 ms. When the quality of voice is to be optimized, the packet length is a compromise between two approaches. One extreme alternative is a short packet, which means that the number of missing packets increases inversely proportionally to packet size and thus distortions occur more frequently. The other extreme is a long packet, which means that distortions occur more rarely but which increases the probability of losing an entire phoneme, and thereby impairing speech intelligibility, particularly when packet length is over 20 ms. The latter limit represents namely the shortest phoneme length. 3) From the point of view of bandwidth, a long packet is, however, more efficient, because the length (36–40 bytes) of the headers (Ethernet+IP+UDP+RTP) is already long compared with the length of the payload (18 bytes/speech block or 36 bytes/speech frame). There are two techniques for reducing the portion of the headers in a packet. Multiplexing can be used for packing a plural number of speech channels into one and the same RTP packet to reduce the portion of the headers. This is highly relevant for an exchange-to-dispatching point connection because it allows all group calls and an individual call to be transmitted in one packet. Another technique, which is suitable for serial connections, is header compression. It allows an IP/UDP/RTP header to be shortened significantly (2 to 4 bytes), thus saving bandwidth. For better voice quality, a short RTP packet (of 30 ms) is therefore more preferable.

Speech blocks can be stolen from a frame either for the purposes of the network (C-stolen) or the user (U-stolen). For example, when end-to-end encryption is used, mobile stations steal one speech block 1–4 times a second for their own purposes to transmit the synchronization vector, as described above.

The RTP standard and many IP speech terminals support ACELP codecs, but the RTP standard does not support the TETRA-specific ACELP. Speech can be transmitted using an RTP packet provided with the following settings, for example: RTP version 2, no filler, no extension, no CRSC sources, no marker, load type: 8 (same as A-law), time stamp increases by 240 units for each packet. This corresponds to the TETRA sampling clock of 8000 Hz and sample length of 30 ms. The following data are provided in the payload: the three first bits indicate if a frame error bit (BFI) has been set, if the payload contains voice or data, and if a C- or U-stolen speech block is concerned; other bits of the first byte are not in use; the next 137 bits comprise the payload and correspond to one speech block. The rest of the payload bits are 0-bits.

The above operation of the gateway GW between a circuit-switched and a packet-switched connection is only one implementation alternative, deviations from it being not relevant to the basic idea of the invention.

The terminal equipment TE shown in FIG. 1 may be a speech terminal or data terminal, and the invention can be applied to voice connections, video connections or data connections requiring real-time data transmission. The terminal equipment TE may be for example a mobile station, dispatcher workstation, base station or some other network element. The terminal equipment TE is not necessarily directly connected to the packet network PDN, but there may be a second TETRA network, for example, between the terminal equipment TE and the packet network PDN. In that case there is a gateway element also at the other end of the packet connection PDN. There may also be another connection or a plural number of packet connections between the elements. If the terminal equipment TE is connected directly to the packet network PDN, as shown in FIG. 1, it functions as the other party of the RTP transmission substantially similarly to the operation of the gateway GW described above.

Figure 7A:
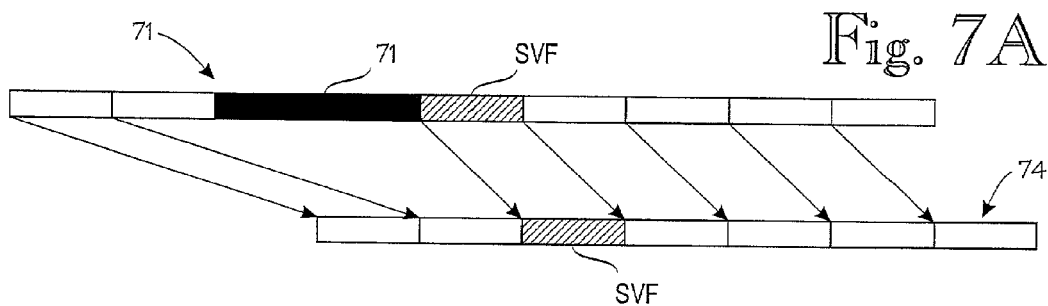
FIG. 7A is a diagram illustrating the reducing of the reproduction delay.
Figure 7B:
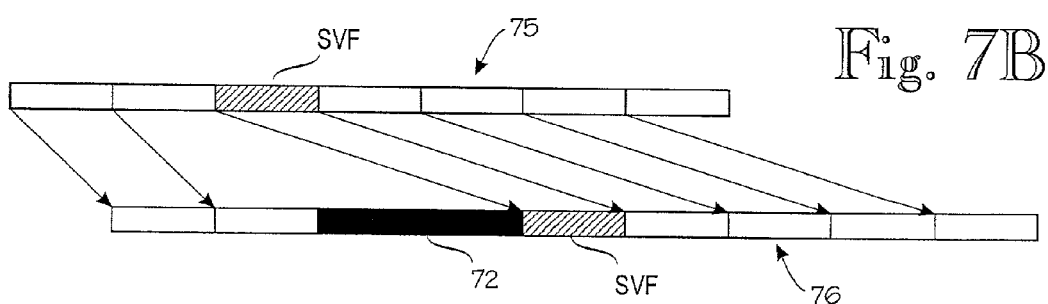
FIG. 7B is a diagram illustrating the increasing of the reproduction delay.

According to the invention, reproduction delay is changed at the receiving end GW or TE of the packet connection PDN during data transmission, such as a speech item or a call, at such a point of time that the frame to be transferred next contains a synchronization vector. According to a preferred embodiment, this is carried out by monitoring arriving frames at the receiving end GW or TE of the packet connection PDN and identifying the synchronization vectors contained in the frames. This allows a change possibly needed in the reproduction delay to be scheduled to take place at a point of time where the next frame to be forwarded comprises a synchronization vector. As an example, let us examine a situation shown in FIG. 1 in which there is a call between the mobile station MS and terminal equipment TE through the packet connection PDN according to the RTP protocol. Data transmission according to the RTP protocol thus takes place between the gateway GW and the terminal equipment TE supporting the protocol. The gateway, which is the receiving end on the packet connection PDN with regard to traffic coming from the terminal equipment TE, monitors the frames coming from the terminal equipment TE in its reception buffer and identifies the synchronization vectors included in them. When a need is detected according to the RTP algorithm to change the reproduction delay, the change is carried out in the gateway GW at a moment after which the next frame to be forwarded from the gateway GW toward the mobile station MS comprises a synchronization vector. The encryption algorithm of the mobile station MS is thus synchronized immediately after the change, even if frames had been removed from or added to the frame sequence, because a frame following an empty space or extra frames comprises a synchronization vector. Correspondingly, the terminal equipment TE, which is the receiving end on the packet connection PDN for traffic coming from the mobile station MS, monitors the frames coming from the gateway GW and identifies the synchronization vectors included in them. When a need is detected according to the RTP algorithm to change the reproduction delay, the change is carried out at the terminal equipment TE at a moment after which the next frame to be forwarded for decryption and reproduction comprises a synchronization vector, the decryption of the terminal equipment TE being thereby immediately synchronized after the change. With reference to the diagram in FIG. 2, the reproduction delay control at the terminal equipment TE thus takes place before the filter block 25. FIG. 7A illustrates the reducing of the reproduction delay according to the invention at the receiving end GW or TE of the packet connection PDN. The Figure shows a frame sequence 73 to be received from which one or more frames 71 are removed and a frame sequence 74 is obtained for forwarding. The frames 71 are removed, in accordance with the invention, just before a frame SVF containing the synchronization vector. Correspondingly, FIG. 7B illustrates the increasing of the reproduction delay of the invention at the receiving end GW or TE of the packet connection PDN. The Figure shows a frame sequence 75 to be received to which one or more frames 72 are added and a frame sequence 76 is obtained for forwarding. According to the invention, the frames 72 are added just before the frame containing the synchronization vector SVF.

It is apparent to a person skilled in the art that as technology advances the basic idea of the invention can be implemented in various ways. The invention and its embodiments are therefore not restricted to the above examples, but they may vary within the scope of the claims.

What is claimed is:

1. A method for maintaining end-to-end synchronization on a telecommunications connection on which data are transmitted in frames substantially in real time and using synchronized end-to-end encryption which is synchronized by occasionally transmitting synchronization vectors in said frames, at least part of the telecommunications connection being a packet-switched connection, whereby the reproduction delay of the data to be transmitted can be increased by adding one or more extra frames to the frame sequence to be transferred and reduced by removing one or more frames from the frame sequence to be transferred, the method comprising the step of:
    changing the reproduction delay during the data transmission at such a moment that the frame to be transferred next after the change comprises a synchronization vector.

2. A method according to claim 1 comprising the steps of:
    monitoring frames arriving at the receiving end of the packet-switched connection;
    identifying synchronization vectors included in the frames; and
    changing the reproduction delay at the receiving end of the packet-switched connection at such a moment that the frame to be forwarded next after the change at the receiving end of the packet-switched connection comprises a synchronization vector.

3. A method according to claim 1 or 2, wherein the packet-switched connection employs an Internet protocol.

4. A method according to claim 1 or 2, wherein the telecommunications connection belongs to the TETRA system.

5. A method according to claim 1 or 2, wherein the encryption is carried out using a key stream segment generated using an initialisation vector.

6. A method according to claim 1 or 2, wherein the synchronization vector comprises an initialisation vector.

7. An arrangement for maintaining end-to-end synchronization on a telecommunications connection on which data are transmitted in frames substantially in real time and using synchronized end-to-end encryption which is synchronized by occasionally transmitting synchronization vectors in said frames, at least part of the telecommunications connection being a packet-switched connection, whereby the reproduction delay of data to be transmitted can be increased by adding one or more extra frames to the frame sequence to be transferred and reduced by removing one or more frames from the frame sequence to be transferred, the arrangement comprising:
    a reproduction delay adjustment system which is arranged to change the reproduction delay during the data transmission at such a moment that the frame to be transferred next after the change comprises a synchronization vector.

8. An arrangement according to claim 7, wherein the reproduction delay adjustment system is arranged to
monitor frames arriving at the receiving end of the packet-switched connection;
identify synchronization vectors included in the frames; and
change the reproduction delay at the receiving end of the packet-switched connection at such a moment that the frame to be forwarded next after the change at the receiving end of the packet-switched connection comprises a synchronization vector.

9. An arrangement according to claim 7 or 8, wherein the packet-switched connection employs an Internet protocol.

10. An arrangement according to claim 7 or 8, wherein the telecommunications connection belongs to the TETRA system.

11. An arrangement according to claim 7 or 8, wherein the encryption is carried out using a key stream segment generated using an initialisation vector.

12. An arrangement according to claim 7 or 8, wherein the synchronization vector comprises an initialisation vector.

13. A network element for maintaining end-to-end synchronization on a telecommunications connection on which data are transmitted in frames substantially in real time and using synchronized end-to-end encryption which is synchronized by occasionally transmitting synchronization vectors in said frames, at least part of the telecommunications connection being a packet-switched connection which comprises the network element capable of increasing the reproduction delay of the data to be transmitted by adding one or more extra frames to the frame sequence to be transferred and reduce the reproduction delay of the data to be transmitted by removing one or more frames from the frame sequence to be transferred, the network element being arranged to change the reproduction delay during the data transmission at such a moment that the frame to be transferred next after the change contains a synchronization vector.

14. A network element according to claim 13, wherein the network element is arranged to
monitor arriving frames at the receiving end of the packet-switched connection (PDN);
identify synchronization vectors included in the frames; and
carry out the change in the reproduction delay at the receiving end of the packet-switched connection (PDN) at such a moment that the frame to be forwarded next after the change at the receiving end of the packet-switched connection comprises a synchronization vector.

15. A network element according to claim 13 or 14, wherein the packet-switched connection employs an Internet protocol.

16. A network element according to claim 13 or 14, wherein the telecommunications connection belongs to the TETRA system.

17. A network element according to claim 13 or 14, wherein the encryption is carried out using a key stream segment generated using an initialisation vector.

18. A network element according to claim 13 or 14, wherein the synchronization vector comprises an initialisation vector.

19. A network element according to claim 13 or 14, wherein the network element is a TETRA dispatcher workstation.

20. A network element according to claim 13 or 14, wherein the network element is a base station.

21. A network element according to claim 13 or 14, wherein the network element is a media gateway.

* * * * *